United States Patent [19]

Sasaki et al.

[11] 4,325,871
[45] Apr. 20, 1982

[54] ORTHO-BIS (2-SUBSTITUTED AZOSTYRYL) BENZENE COMPOUNDS

[75] Inventors: Masaomi Sasaki, Shizuoka; Mitsuru Hashimoto, Numazu; Tomiko Kawakami, Tokyo, all of Japan

[73] Assignee: Ricoh Company, Ltd., Tokyo, Japan

[21] Appl. No.: 158,461

[22] Filed: Jun. 11, 1980

[30] Foreign Application Priority Data

Jun. 20, 1979 [JP] Japan .................................. 54-76715

[51] Int. Cl.³ .................... C09B 35/03; C09B 35/033; C09B 35/215; G03G 5/04
[52] U.S. Cl. .................................... 260/160; 260/178; 260/184; 260/141; 564/307; 568/928; 430/72; 430/79
[58] Field of Search ........................ 260/160, 178, 184

[56] References Cited

U.S. PATENT DOCUMENTS

| | | | |
|---|---|---|---|
| 3,775,105 | 11/1973 | Kukla | 96/1.6 |
| 3,898,084 | 8/1975 | Champ et al. | 96/1.5 |
| 3,977,870 | 8/1976 | Rochlitz et al. | 96/1.5 |
| 4,018,606 | 4/1977 | Contois et al. | 96/1.7 |
| 4,026,704 | 5/1977 | Rochlitz et al. | 96/1.5 |
| 4,052,210 | 10/1977 | Hectors | 96/1.5 |

FOREIGN PATENT DOCUMENTS

| | | | |
|---|---|---|---|
| 53-150128 | 5/1978 | Japan | 96/1.5 |
| 54-155227 | 5/1979 | Japan | 260/164 |

Primary Examiner—Floyd D. Higel
Attorney, Agent, or Firm—Oblon, Fisher, Spivak, McClelland & Maier

[57] ABSTRACT

A bis-azo compound of the formula

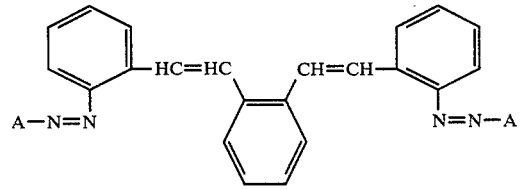

wherein A represents

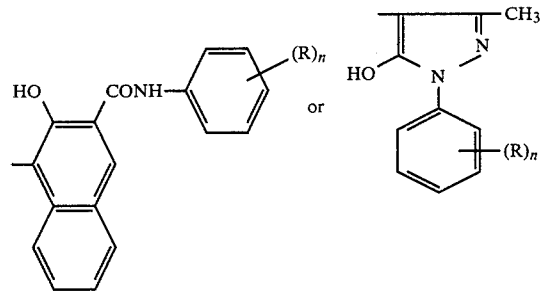

wherein R represents alkyl, alkoxy, nitro, dialkylamino or halogen, and n represents an integer 0, 1, 2 or 3 and when n is 2 or 3, R represents identical or different substituents selected from the group of alkyl, alkoxy, nitro, dialkylamino and halogen. The bis-azo compound is useful as a photoconductive material for the preparation of electrophotographic photoconductors.

14 Claims, 2 Drawing Figures

ORTHO-BIS (2-SUBSTITUTED AZOSTYRYL) BENZENE COMPOUNDS

BACKGROUND OF THE INVENTION

The present invention relates to novel bis-azo compounds and to their preparation and use, and more particularly to bis-azo compounds represented by the general formula

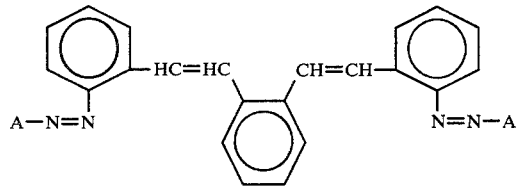

where A represents

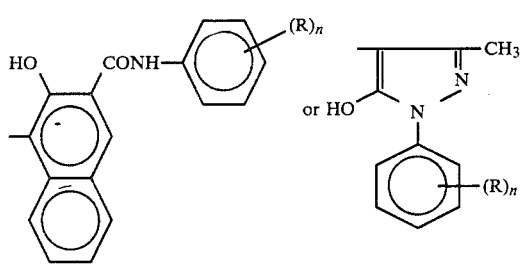

wherein R represents alkyl, alkoxy, nitro, dialkylamino or halogen, and n represents an integer 0, 1, 2 or 3 and when n is 2 or 3, R represents identical or different substituents selected from the group of alkyl, alkoxy, nitro, dialkylamino and halogen.

The present invention also relates to a process for preparing the above-mentioned bis-azo compounds by allowing a tetrazonium salt represented by the general formula

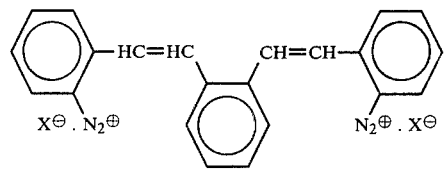

wherein X represents an anion functional group to react with a coupling component represented by the general formula

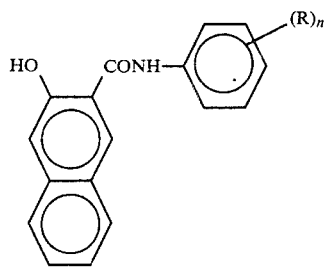

or with a coupling component represented by the general formula

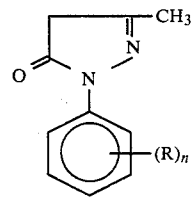

wherein R represents alkyl, alkoxy, nitro, dialkylamino or halogen, and n represents an integer 0, 1, 2 or 3 and when n is 2 or 3, R represents identical or different substituents selected from the group of alkyl, alkoxy, nitro, dialkylamino and halogen. The thus prepared bis-azo compounds are extremly useful in electrophotographic photoconductors.

SUMMARY OF THE INVENTION

It is therefore an object of the present invention to provide bis-azo compounds represented by the following formula

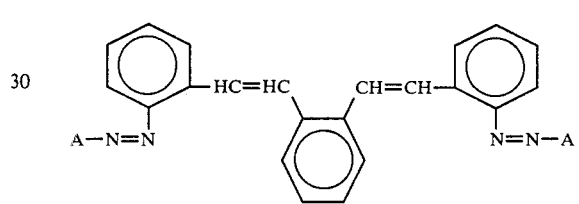

wherein A represents

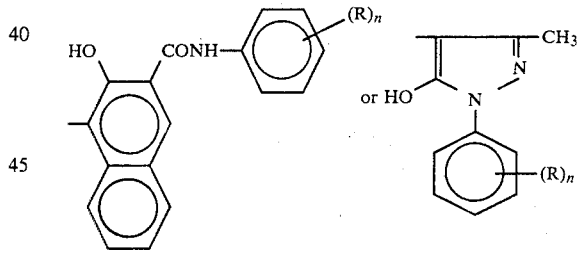

wherein R represents alkyl, alkoxy, nitro, dialkylamino or halogen and n represents an integer 0, 1, 2 or 3 and when n is 2 or 3, R represents identical or different substituents selected from the group of alkyl, alkoxy, nitro, dialkylamino and halogen.

Another object of the present invention is to provide a process for preparing the above-mentioned bis-azo compounds by allowing a tetrazonium salt represented by general formula

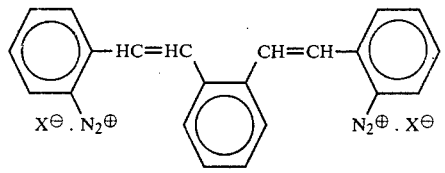

(wherein X represents an anion functional group) to react with a coupling component represented by the general formula

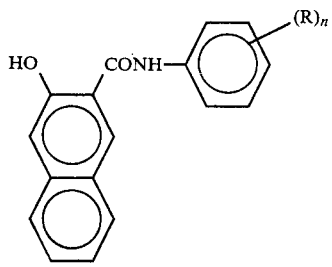

or with a coupling component represented by the general formula

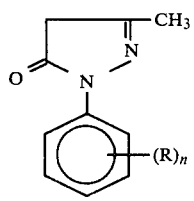

wherein R represents alkyl, alkoxy, nitro, dialkylamino or halogen, and n represents an integer 0, 1, 2 or 3 and when n is 2 or 3, R represents identical or different substituents selected from the group of alkyl, alkoxy, nitro, dialkylamino and halogen.

DETAILED DESCRIPTION OF THE PREFERRED EMBODIMENTS

Figure 1:
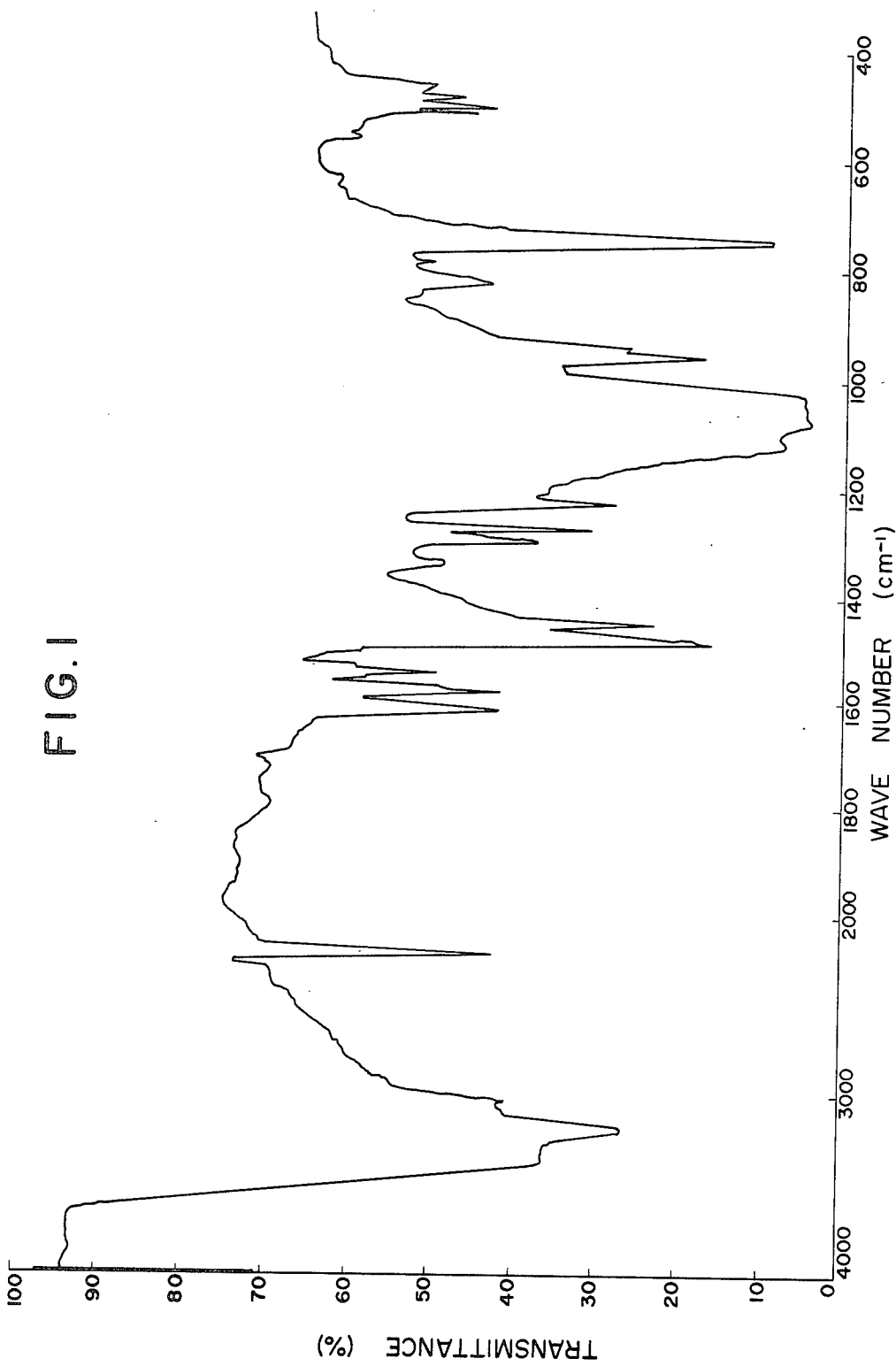
FIG. 1 is the infrared spectra of a tetrazonium difluroborate obtained in Example 1.

The novel bis-azo compounds according to the present invention are prepared by allowing a tetrazonium salt to react with a coupling component represented by the aforementioned general formula.

The tetrazonium salt can be prepared, for example, by reducing 1,2-bis(2-nitrostyryl) benzene represented by the formula

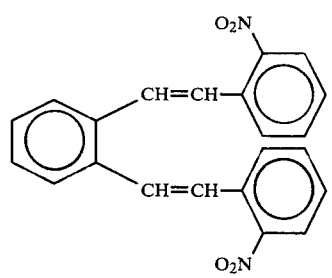

to obtain 1,2-bis(2-aminostyryl) benzene represented by the formula

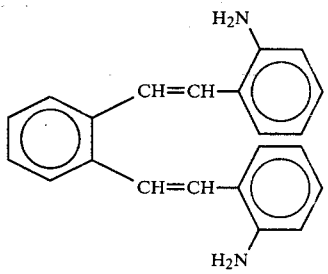

and then subjecting the same to diazotation. More specifically, 1,2-bis(2-aminostyryl) benzene can be prepared by preparing 1,2-bis(2-nitrostyryl) benzene and reducing the same by using a reductant, for example, iron hydrochloride, in an organic solvent, such as N,N-dimethylformamide. The reduction of 1,2-bis(2-nitrostyryl) benzene terminates in 30 minutes to 2 hours at temperatures in the range of 70° to 120° C.

Diazotation of 1,2-bis(2-aminostyryl) benzene thus prepared is conducted as follows:

1,2-bis(2-aminostyryl) benzene is added to a dilute inorganic acid, such as dilute hydrochloric acid or dilute sulfuric acid. To the mixture is added an aqueous solution of sodium nitrite, while maintaining the temperature of the mixture in the range of −10° C. to 10° C. The diazotation reaction terminates in 30 minutes to 3 hours. It is preferable that the diazonium compound of 1,2-bis(2-aminostyryl) benzene be separated in the form of the tetrazonium salt by adding, for example, fluoboric acid to the reaction mixture, to precipitate the tetrazonium salt. The tetrazonium salt is then separated from the solution by filtration. To the thus obtained tetrazonium salt is added a coupling component which has been mentioned previously in the amount of one to 10 times the molar weight of the tetrazonium salt, preferably in the amount of 2 to 5 times the molar weight of the tetrazonium salt, so as to allow a coupling reaction. In practice, this coupling reaction is accomplished by dissolving both the tetrazonium salt and the coupling material in an organic solvent, such as N,N-dimethylformamide or dimethyl sulfoxide and then adding dropwise an alkaline aqueous solution, such as an aqueous solution of sodium acetate, while maintaining the reaction mixture at temperatures between approximately −10° C. to 10° C. The reaction terminates in 5 minutes to 30 minutes, whereby the novel bis-azo compound can be prepared.

The invention will now be described in more detail by reference to the following examples:

EXAMPLE 1

(Preparation of Tetrazonium Salt)

17.5 g of 1,2-bis(2-aminostyryl) benzene was added to a dilute hydrochloric acid consisting of 600 ml of water and 30 ml of concentrate hydrochloric acid, and the mixture was stirred at 60° C. for 30 minutes and the formed milky dispersion was cooled to 0° C. To the mixture, an aqueous solution of sodium hyponitrite consisting of 8.0 g of sodium hyponitrite and 25 ml of water was added dropwise over a period of 40 minutes. The rate of addition of the sodium hyponitrite solution was so regulated that the temperature remained between 0° C. to 5° C. Thereafter, the reaction mixture was stirred for 30 minutes, and 30 ml of 42 percent fluoboric acid was added thereto. Yellowish-red cryspounds according to the present invention can be used in preparing electrophotographic photoconductors, for example, as follows:

(1) The bis-azo compounds are ground in small particles with a diameter in the range of approximately 0.05 to 5μ and the particles are then dispersed in a binder resin, such as polyester, polyamide, polyurethane, polyketone, polycarbonate, polystyrene or polyvinyl toluene. The dispersion is layered on an electroconductive support, whereby an electrophotographic photoconductor is prepared.

(2) To the bis-azo compound layer prepared in (1), an inorganic photoconductive material, for example, known cadmium sulfide, cadmium sulfide-selenium alloys or the like, is added; or an organic photoconductive material, for example, known poly-N-vinylcarbazole, polyvinyl pyrene or the like is added thereto, whereby an electrophotographic photoconductor is prepared.

(3) A layer of the bis-azo compounds with a thickness of approximately 0.05 to 10μ is formed on an electroconductive support and another photoconductive layer is formed on the bis-azo compound layer, thereby a layered type electrophotographic photoconductor is prepared.

EXAMPLE 15

This is an example of an electrophotographic photoconductor in which bis-azo compound No. 1 prepared in Example 2 is employed.

A mixture of 1 part by weight of a polyester resin (Trade name: Polyester Adhesive 49000 made by Du Pont), 1 part by weight of the bis-azo compound No. 1, and 26 parts by weight of tetrahydrofuran was ground in a ball mill. This dispersion was coated on an aluminum evaporated polyester film by a doctor blade and was then dried at 100° C. for 10 minutes, so that a photosensitive layer about 7μ thick was formed on the aluminum evaporated polyester film, forming an electrophotographic photoconductor.

The photosensitive layer surface of the electrophotographic photoconductor was charged positively in the dark under application of +6 KV of corona charge for 20 seconds by a commercially available electrostatic copying sheet testing apparatus and was then allowed to stand in the dark for 20 seconds without applying any charge thereto, and the surface potential Vpo (V) of the photoconductor was measured. The photoconductor was then illuminated by a tungsten lamp in such a manner that the illuminance on the illuminated surface of the photoconductor was 20 lux, so that the exposure $E_{\frac{1}{2}}$ (lux.sec) required to reduce the initial surface potential Vpo (V) to $\frac{1}{2}$ the initial surface potential Vpo (V) was measured. The result showed that Vpo=550 V and $E_{\frac{1}{2}}$ was 6.0 lux.sec.

The charge retention property in the dark and the photosensitivity of this photoconductor were excellent.

tals seprated, which were collected on a suction funnel and washed with water and dried, whereby tetrazonium difluorborate was obtained. The yield was 25.5 g (91.1%). The decomposition point of the tetrazonium difluoborate was 95° C. or above. The infrared spectra thereof, which is shown in FIG. 1, was measured by use of a KBr tablet. The —N=N— bond gave rise to infrared absorption at 2,220 cm$^{-1}$ and the trans —CH=CH— bond gave rise to infrared absorption at 960 cm$^{-1}$ as can be seen from the infrared spectra in FIG. 1.

EXAMPLE 2

(Bis-azo Compound: Compound No. 1)

Figure 2:
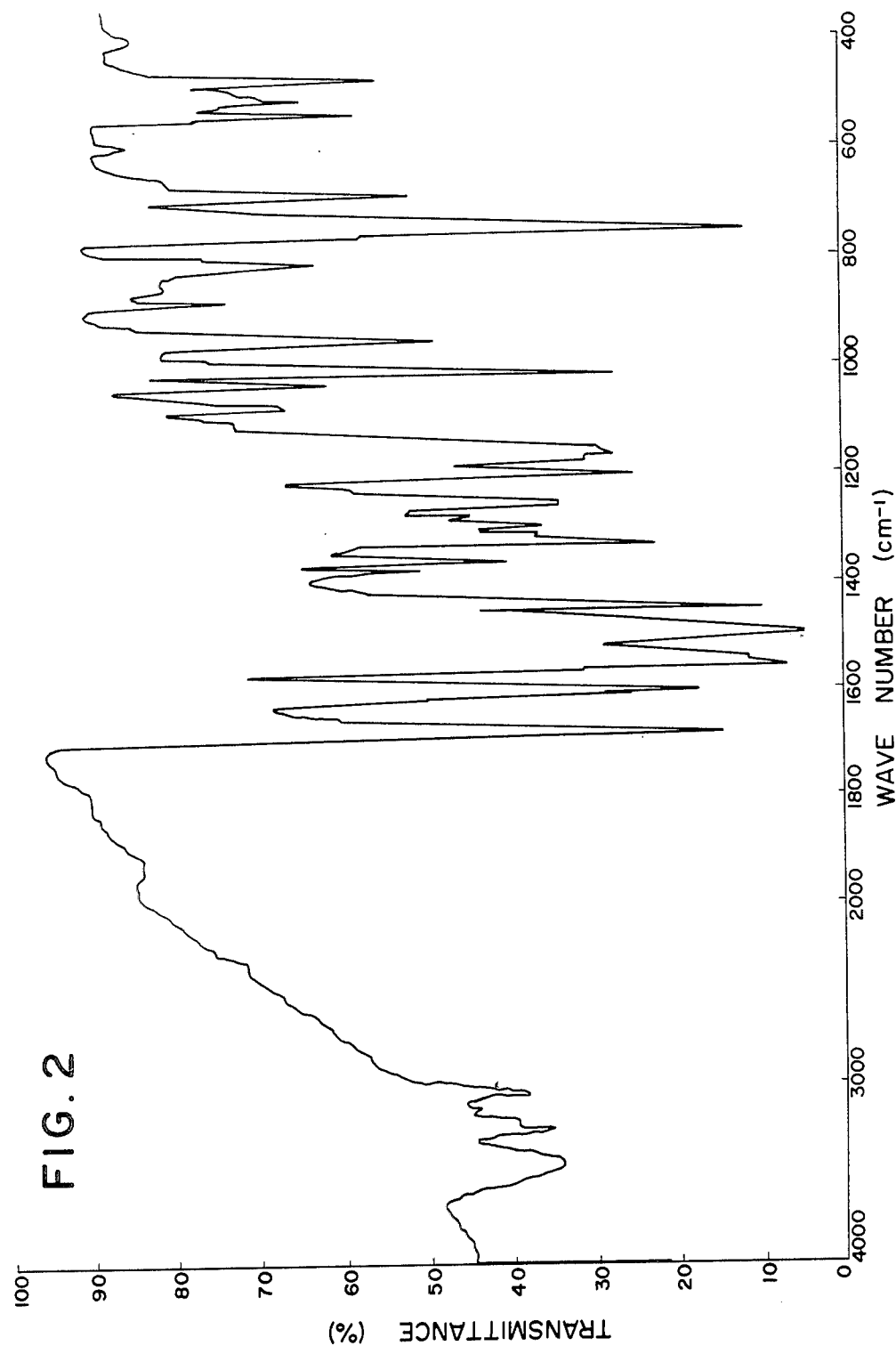
FIG. 2 is the infrared spectra of a novel bis-azo compound according to the present invention, which has been obtained in Example 2.

3.0 g of the tetrazonium salt obtained in Example 1 and 3.3 g of a coupling component, 2-hydroxy-3-naphthoic anilide, were dissolved in 390 ml of cooled N,N-dimethylformamide. To the solution, a sodium acetate aqueous solution consisting of 1.9 g of sodium acetate and 20 ml of water was added dropwise over a period of one hour, while the reaction mixture was kept at temperatures below 5° C. After stopping such cooling, the reaction mixture was stirred at room temperature for 3 hours. Thereafter, the product precipitated was separated by filteration and was washed with 300 ml of water three times and was then washed with 300 ml of N,N-dimethylformamide 5 times. Furthermore, the product was washed with acetone to remove the remaining N,N-dimethylformamide from the product and was then dried at 70° C. under reduced pressure of 2 mmHg, whereby bis-azo compound No. 1 shown in Table 1 was obtained. The yield was 4.6 g (90.5 percent of the theoretical amount). The infrared spectra of the bis-azo compound is shown in FIG. 2.

EXAMPLES 3 to 14

(Bis-azo Compounds No. 2 to 13)

Bis-azo compounds No. 2 to 13 listed in Table 1 were prepared in accordance with the same procedure as that in Example 2, except that coupling components listed in Table 2 were used instead of the coupling component employed in Example 2.

The inventors of the present invention have discovered that the bis-azo compounds according to the present invention are useful as photographic photoconductive materials.

Before explaining the specific use of the bis-azo compounds according to the present invention as electrophotographic materials, the photoconductors and materials for use in electrophotography will now be explained.

As the photoconductors for use in electrophotography, inorganic photoconductors comprising an electroconductive support material and an inorganic photoconductive material, such as selenium, cadmium sulfide or zinc oxide, which is coated on the electroconductive support material, are known. Generally, in the art of electrophotography, a photoconductor is electrically charged, for example, by corona charging in the dark, and is then exposed to a light image, which selectively dissipates the charge in the illuminated areas of the photoconductor while leaving behind a latent electrostatic image in the non-illuminated areas. This latent electrostatic image may then be developed to form a visible image by depositing finely divided electroscopic marking particles called toner, which comprises coloring materials such as dyestuff or pigments, and a binder material comprising polymeric compounds, on the photoconductor. The following fundamental characteristics are required for photoconductors for use in electrophotography:

(1) The photoconductors must be electrically chargeable to a predetermined potential in the dark.

(2) The photoconductors must retain the charge sufficiently in the dark. In other words, the dark decay of the photoconductors must be small.

(3) The charge on the photoconductors must be dissipated quickly under illumination. In other words, the light decay of the photoconductors must be great and accordingly the photosensitivity must be high.

Additionally, it is required that the photoconductors have high mechanical strength and be workable into the desired shape.

The conventional inorganic photoconductors have some advantages, but, at the same time, they have several drawbacks. For example, the selenium photoconductor which is now widely used can satisfy the above-mentioned requirements (1), (2) and (3) to some extent. However, difficulties are encountered when producing the photoconductor and its production cost is high. More specifically, since its flexibility is poor, it is difficult to form it into various shapes. Furthermore, it is highly susceptible to heat and mechanical shocks, so care must be taken when handling it. Cadmium sulfide and zinc oxide are generally used by dispersing each of them in a binder resin. However, since they are poor in mechanical characteristics, such as smoothness, hardness, tensile strength and durability, they cannot be used repeatedly as they are. For instance, a protective layer is required, which makes the process of producing the electrophotographic element using those materials complex.

Recently, in order to eliminate the above-mentioned drawbacks of the inorganic photoconductors, a variety of organic electrophotographic photoconductors have been studied and developed and used in practice, for example, a photoconductor comprising a support material and a photosensitive layer containing poly-N-vinylcarbazole and 2,4,7-trinitrofluorene-9-on (U.S. Pat. No. 3,484,237), which is formed on the support material; a photoconductor comprising a photosensitive layer containing poly-N-vinylcarbazole sensitized by pyrylium salt dyestuff (Japanese Patent No. 48-25658); a photoconductor having a photosensitive layer consisting essentially of an organic pigment (Japanese Laid-Open Patent Application No. 47-37543); and a photoconductor having a photosensitive layer which contains as a main component an eutectic crystal complex consisting of a dyestuff and a resin (Japanese Laid-Open Patent Application No. 47-10735). These organic electrophotographic photoconductors are improved with respect to mechanical characteristics and working properties to some extent in comparison with those of the inorganic photoconductors. However, generally the organic photoconductors are low in photosensitivity and accordingly do not satisfy sufficiently the requirements for electrophotographic photoconductors. Furthermore, the characteristics of electrophotographic photoconductors significantly depend upon materials used and preparation methods, in particular, upon photoconductive materials, and therefore, photoconductive materials have been studied actively.

The inventors of the present invention have discovered that the bis-azo compounds according to the present invention are particularly useful as electrophotographic photoconductive materials. The bis-azo com-

TABLE 1

| Compound No. | Structural Formula of Bis-azo compounds | Elemental Value | | | Infrared Spectra cm$^{-1}$ (KBr Method) | |
|---|---|---|---|---|---|---|
| | | | Calculated (%) | Found | $\nu C=O$ | $\delta t(CH=CH)$ |
| 1 | | C H N | 78.11 4.69 9.76 | 77.95 4.67 9.69 | 1,680 | 960 |
| 2 | | C H N | 70.72 4.04 11.79 | 70.58 4.01 11.75 | 1,680 | 950 |
| 3 | | C H N | 75.63 4.82 9.13 | 75.60 4.83 9.11 | 1,680 | 960 |
| 4 | | C H N | 75.63 4.82 9.13 | 75.49 4.76 9.15 | 1,670 | 960 |
| 5 | | C H N | 78.35 5.00 9.45 | 78.30 5.00 9.43 | 1,680 | 960 |

TABLE 1-continued

| Compound No. | Structural Formula of Bis-azo compounds | Elemental Value Calculated (%) | | Found | Infrared Spectra cm$^{-1}$ (KBr Method) νC=O | δt(–CH=CH–) |
|---|---|---|---|---|---|---|
| 6 | | C<br>H<br>N | 73.32<br>4.13<br>9.04 | 73.21<br>4.08<br>9.00 | 1,680 | 960 |
| 7 | | C<br>H<br>N | 76.08<br>5.33<br>11.83 | 75.91<br>5.35<br>11.87 | 1,670 | 955 |
| 8 | | C<br>H<br>N | 73.45<br>4.94<br>8.57 | 73.30<br>4.90<br>8.51 | 1,675 | 960 |
| 9 | | C<br>H<br>N | 78.57<br>5.29<br>9.17 | 78.5<br>5.30<br>9.15 | 1,680 | 955 |
| 10 | | C<br>H<br>N | 68.62<br>4.42<br>8.00 | 68.49<br>4.50<br>7.95 | 1,680 | 960 |

TABLE 1-continued

| Compound No. | Structural Formula of Bis-azo compounds | | Elemental Value | | Infrared Spectra cm$^{-1}$ (KBr Method) | |
|---|---|---|---|---|---|---|
| | | | Calculated (%) | Found | νC=O | δt(-CH=CH-) |
| 11 | [structure] | C H N | 68.62 4.42 8.00 | 68.59 4.31 7.89 | 1,680 | 960 |
| 12 | [structure] | C H N | 73.87 5.03 16.41 | 73.70 5.01 16.37 | — | 960 |
| 13 | [structure] | C H N | 65.27 4.18 18.13 | 65.29 4.17 18.10 | — | 960 |

(Note)
The melting point of the listed bis-azo compounds was 250° C. or above.

TABLE 2

| Compound No. | Coupling Component |
|---|---|
| 2 | HO, CONH—C₆H₄—NO₂ (naphthalene, 3-nitro) |
| 3 | HO, CONH—C₆H₄—OCH₃ (naphthalene, 2-OCH₃) |
| 4 | HO, CONH—C₆H₄—OCH₃ (naphthalene, 4-OCH₃) |
| 5 | HO, CONH—C₆H₄—CH₃ (naphthalene, 2-CH₃) |
| 6 | HO, CONH—C₆H₄—Cl (naphthalene, 4-Cl) |
| 7 | HO, COHN—C₆H₄—N(CH₃)₂ (naphthalene) |
| 8 | HO, CONH—C₆H₃(OCH₃)₂ (naphthalene, 2,5-diOCH₃) |
| 9 | HO, CONH—C₆H₃(CH₃)₂ (naphthalene, 2,4-diCH₃) |
| 10 | HO, CONH—C₆H₂(OCH₃)₂Cl (naphthalene, 2,5-diOCH₃-4-Cl) |

TABLE 2-continued

| Compound No. | Coupling Component |
|---|---|
| 11 | HO, CONH—C₆H₃(Cl)(OCH₃)(OCH₃) (naphthalene) |
| 12 | 3-methyl-1-phenyl-5-pyrazolone |
| 13 | 3-methyl-1-(4-nitrophenyl)-5-pyrazolone |

What is claimed is:

1. A bis-azo compound of the formula

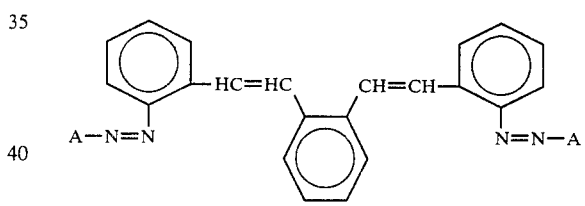

in which A represents identical subsituents selected from the group consisting of

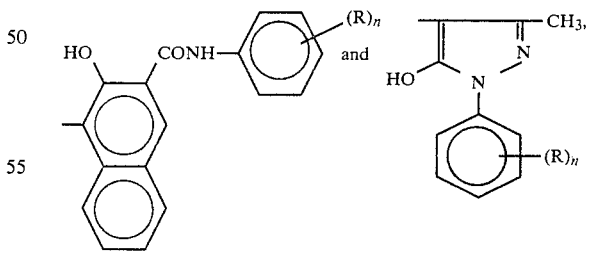

wherein R represents alkyl, alkoxy, nitro, dialkylamino or halogen, and n represents an integer 0, 1, 2 or 3 and when n is 2 or 3, R represents identical or different substituents selected from the group consisting of alkyl, alkoxy, nitro, dialkylamino and halogen.

2. A bis-azo compound of the formula

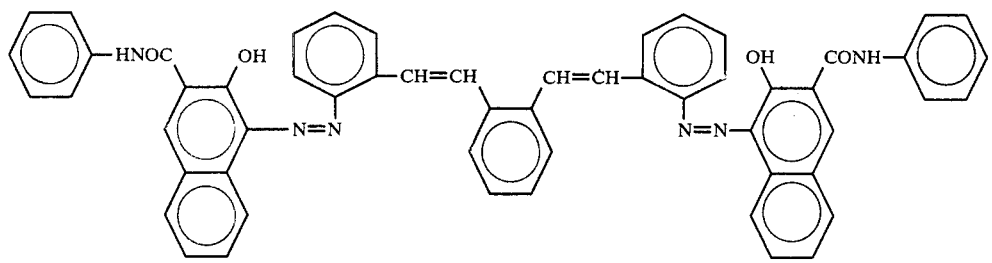
3. A bis-azo compound of the formula
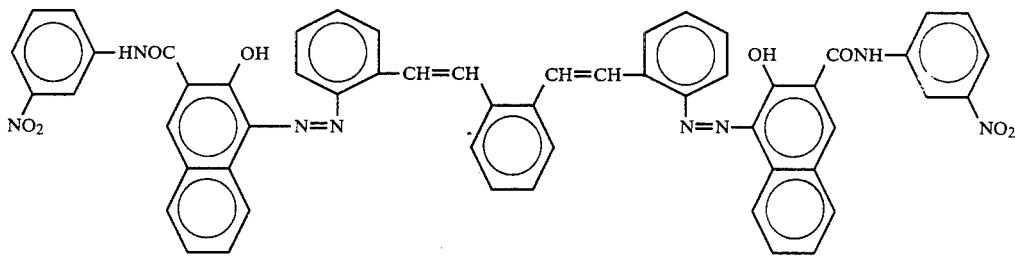
4. A bis-azo compound of the formula
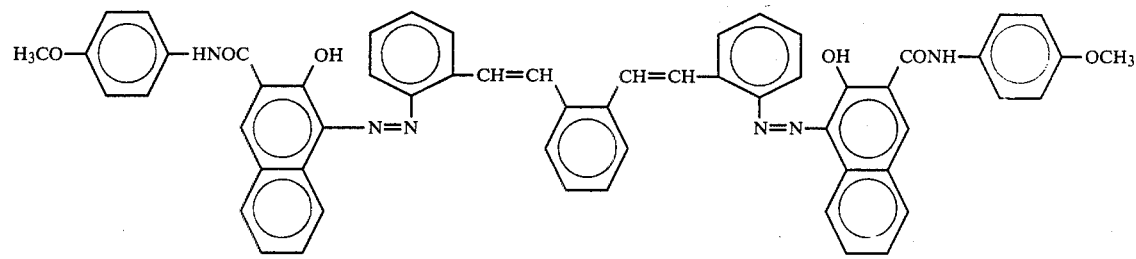
5. A bis-azo compound of the formula
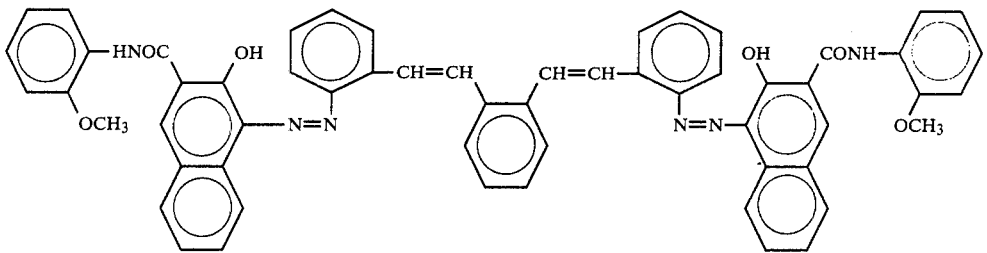
6. A bis-azo compound of the formula
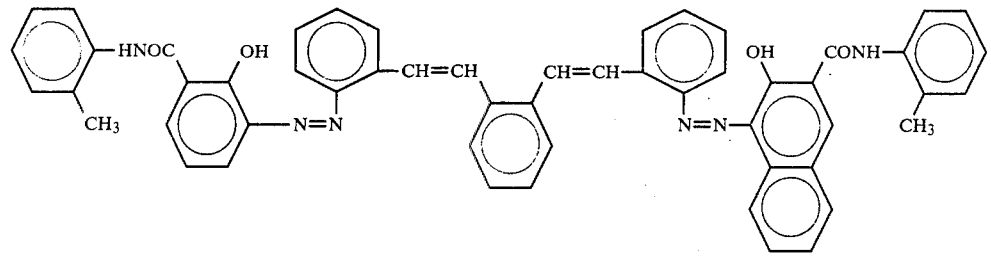
7. A bis-azo compound of the formula

8. A bis-azo compound of the formula
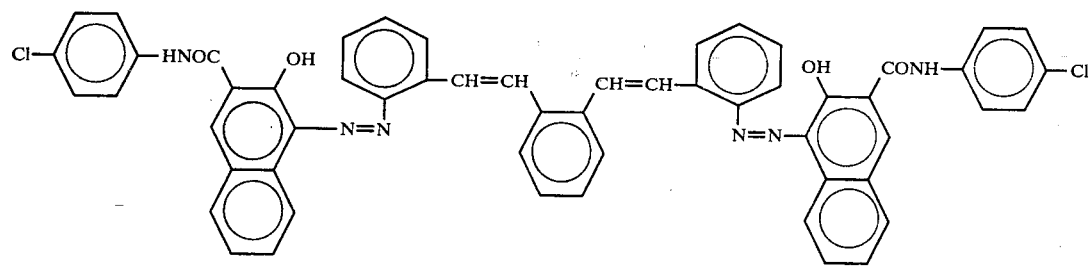
9. A bis-azo compound of the formula
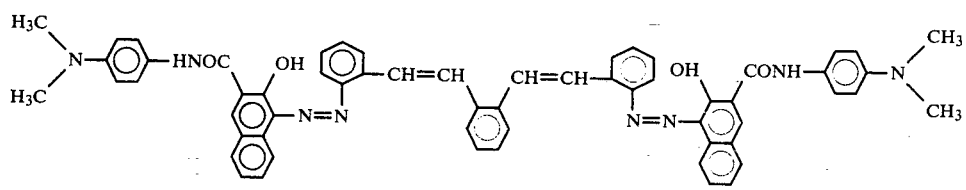
10. A bis-azo compound of the formula
11. A bis-azo compound of the formula
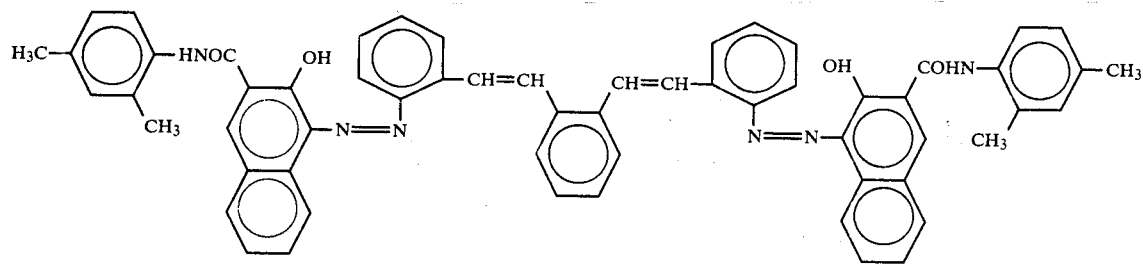
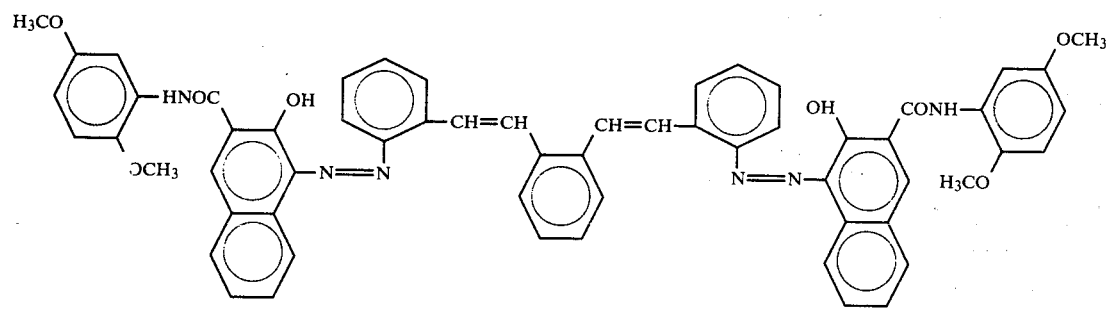
12. A bis-azo compound of the formula
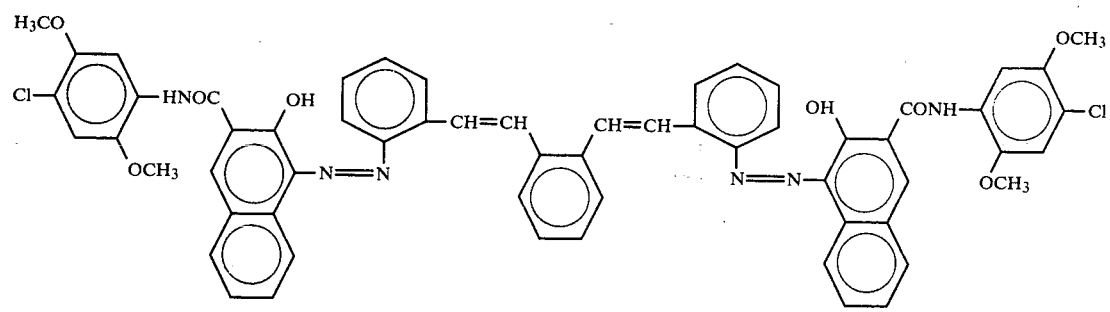

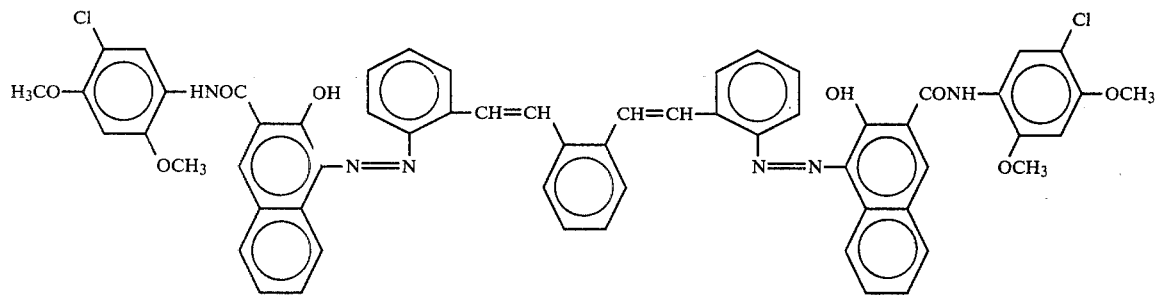
13. A bis-azo compound of the formula
14. A bis-azo compound of the formula
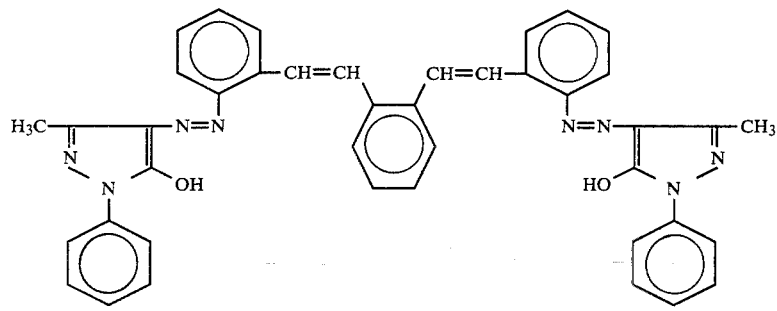
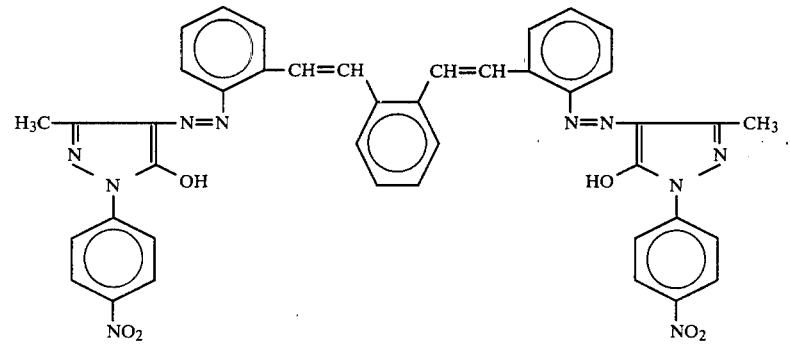
* * * * *

UNITED STATES PATENT AND TRADEMARK OFFICE
CERTIFICATE OF CORRECTION

PATENT NO. : 4,325,871

DATED : April 20, 1982

INVENTOR(S) : Sasaki et al

It is certified that error appears in the above—identified patent and that said Letters Patent is hereby corrected as shown below:

Column 2, line 19, change "extremly" to --extremely--.

Column 3, line 1, delete both parenthesis.

Column 4, line 26, change "nitrite" to --hyponitrite--.

Column 5, line 24, change "filteration" to --filtration--.

Table 1, Compound No 1, should read --

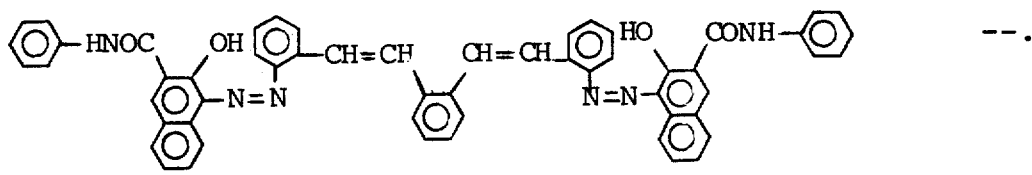

--.

UNITED STATES PATENT AND TRADEMARK OFFICE
CERTIFICATE OF CORRECTION

PATENT NO. : 4,325,871
DATED : April 20, 1982
INVENTOR(S) : Sasaki et al

It is certified that error appears in the above—identified patent and that said Letters Patent is hereby corrected as shown below:

Table 1, Compound No. 5 should read --

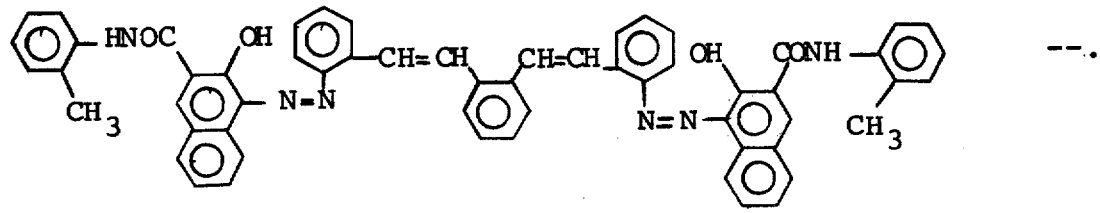

--.

Signed and Sealed this

Fifteenth Day of March 1983

[SEAL]

Attest:

GERALD J. MOSSINGHOFF

Attesting Officer

Commissioner of Patents and Trademarks